United States Patent
Mercer et al.

(10) Patent No.: US 6,568,091 B1
(45) Date of Patent: May 27, 2003

(54) ROTOR COMPONENT DISPLACEMENT MEASUREMENT SYSTEM

(75) Inventors: Gary D. Mercer, Simpsonville, SC (US); Ming C. Li, Cincinnati, OH (US); Charles R. Baum, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/511,552

(22) Filed: Feb. 23, 2000

(51) Int. Cl.⁷ ................................................ G01B 5/24
(52) U.S. Cl. ...................................... 33/1 PT; 33/700
(58) Field of Search .................. 33/1 PT, 700, 33/701, 706, 707, 708

(56) References Cited

U.S. PATENT DOCUMENTS

| | | | | |
|---|---|---|---|---|
| 3,989,408 A | * | 11/1976 | Jaegtnes | 415/14 |
| 4,225,851 A | * | 9/1980 | Reschovsky et al. | 340/177 CA |
| 4,302,963 A | * | 12/1981 | Collins | 73/1 J |
| 4,357,104 A | * | 11/1982 | Davinson | 356/4 |
| 4,518,917 A | * | 5/1985 | Oates et al. | 324/207 |
| 4,644,270 A | * | 2/1987 | Oates et al. | 324/207 |
| 4,659,988 A | * | 4/1987 | Goff et al. | 324/207 |
| 4,804,905 A | * | 2/1989 | Ding et al. | 324/61 P |
| 5,508,609 A | * | 4/1996 | Parkinson et al. | 324/207.25 |
| 5,994,803 A | * | 11/1999 | Jung | 310/51 |
| 6,105,439 A | * | 8/2000 | Roger | 73/862.49 |
| 6,227,061 B1 | * | 5/2001 | Thermos | 73/866.5 |

FOREIGN PATENT DOCUMENTS

| | | | | |
|---|---|---|---|---|
| DE | 3908248 A1 | * | 9/1990 | 33/706 |
| GB | 2062875 A | * | 5/1981 | H02K/5/00 |
| JP | 363210612 A | * | 9/1988 | 33/706 |
| JP | 401169308 A | * | 7/1989 | 33/1 PT |
| JP | 410169407 A | * | 6/1998 | F01D/25/00 |
| RU | 2002070 C1 | * | 2/1994 | F01D/21/04 |

OTHER PUBLICATIONS

U.S. patent application Publication: US2001/0006601 A1 (Wilson et al), Jul. 2001, 416/95.*
"39$^{th}$ GE Turbine State–of–the–Art Technology Seminar", Tab 1, ""F" Technology—the First Half–Million Operating Hours", H.E. Miller, Aug. 1996.
"39th GE Turbine State–of–the–Art Technology Seminar", Tab 2, "GE Heavy–Duty Gas Turbine Performance Characteristics", F. J. Brooks, Aug. 1996.
"39th GE Turbine State–of–the–Art Technology Seminar", Tab 3, "9EC 50Hz 170–MW Class Gas Turbine", A. S. Arrao, Aug. 1996.
"39th GE Turbine State–of–the–Art Technology Seminar", Tab 4, "MWS6001FA—An Advanced–Technology 70–MW Class 50/60 Hz Gas Turbine", Ramachandran et al., Aug. 1996.
"39th GE Turbine State–of–the–Art Technology Seminar", Tab 5, "Turbomachinery Technology Advances at Nuovo Pignone", Benvenuti et al., Aug. 1996.

(List continued on next page.)

*Primary Examiner*—Diego Gutierrez
*Assistant Examiner*—Mirellys Jagan
(74) *Attorney, Agent, or Firm*—Nixon & Vanderhye P.C.

(57) ABSTRACT

A measuring system for measuring axial displacement of a tube relative to an axially stationary component in a rotating rotor assembly includes at least one displacement sensor adapted to be located normal to a longitudinal axis of the tube; an insulated cable system adapted for passage through the rotor assembly; a rotatable proximitor module located axially beyond the rotor assembly to which the cables are connected; and a telemetry system operatively connected to the proximitor module for sampling signals from the proximitor module and forwarding data to a ground station.

8 Claims, 5 Drawing Sheets

OTHER PUBLICATIONS

"39th GE Turbine State–of–the–Art Technology Seminar", Tab 6, "GE Aeroderivative Gas Turbines—Design and Operating Features", M.W. Horner, Aug. 1996.
"39th GE Turbine State–of–the–Art Technology Seminar", Tab 7, "Advance Gas Turbine Materials and Coatings", P.W. Schilke, Aug. 1996.
"39th GE Turbine State–of–the–Art Technology Seminar", Tab 8, "Dry Low $NO_x$ Combustion Systems for GE Heavy––Duty Turbines", L. B. Davis, Aug. 1996.
"39th GE Turbine State–of–the–Art Technology Seminar", Tab 9, "GE Gas Turbine Combustion Flexibility", M. A. Davi, Aug. 1996.
"39th GE Turbine State–of–the–Art Technology Seminar", Tab 10, "Gas Fuel Clean–Up System Design Considerations for GE Heavy–Duty Gas Turbines", C. Wilkes, Aug. 1996.
"39th GE Turbine State–of–the–Art Technology Seminar", Tab 11, "Integrated Control Systems for Advanced Combined Cycles", Chu et al., Aug. 1996.
"39th GE Turbine State–of–the–Art Technology Seminar", Tab 12, "Power Systems for the 21st Century "H" Gas Turbine Combined Cycles", Paul et al., Aug. 1996.
"39th GE Turbine State–of–the–Art Technology Seminar", Tab 13, "Clean Coal and Heavy Oil Technologies for Gas Turbines", D. M. Todd, Aug. 1996.
"39th GE Turbine State–of–the–Art Technology Seminar", Tab 14, "Gas Turbine Conversions, Modifications and Uprates Technology", Stuck et al., Aug. 1996.
"39th GE Turbine State–of–the–Art Technology Seminar", Tab 15, "Performance and Reliability Improvements for Heavy–Duty Gas Turbines, "J. R. Johnston, Aug. 1996.
"39th GE Turbine State–of–the–Art Technology Seminar", Tab 16, "Gas Turbine Repair Technology", Crimi et al, Aug. 1996.
"39th GE Turbine State–of–the–Art Technology Seminar", Tab 17, "Heavy Duty Turbine Operating & Maintenance Considerations", R. F. Hoeft, Aug. 1996.
"39th GE Turbine State–of–the–Art Technology Seminar", Tab 18, "Gas Turbine Performance Monitoring and Testing", Schmitt et al., Aug. 1996.
"39th GE Turbine State–of–the–Art Technology Seminar", Tab 19, "Monitoring Service Delivery System and Diagnostics", Madej et al., Aug. 1996.
"39th GE Turbine State–of–the–Art Technology Seminar", Tab 20, "Steam Turbines for Large Power Applications", Reinker et al., Aug. 1996.
"39th GE Turbine State–of–the–Art Technology Seminar", Tab 21, "Steam Turbines for Ultrasupercritical Power Plants", Retzlaff et al., Aug. 1996.
"39th GE Turbine State–of–the–Art Technology Seminar", Tab 22, "Steam Turbine Sustained Efficiency", P. Schofield, Aug. 1996.
"39th GE Turbine State–of–the–Art Technology Seminar", Tab 23, "Recent Advances in Steam Turbines for Industrial and Cogeneration Applications", Leger et al., Aug. 1996.
"39th GE Turbine State–of–the–Art Technology Seminar", Tab 24, "Mechanical Drive Steam Turbines", D. R. Leger, Aug. 1996.
"39th GE Turbine State–of–the–Art Technology Seminar", Tab 25, "Steam Turbines for STAG™ Combined–Cycle Power Systems", M. Boss, Aug. 1996.
"39th GE Turbine State–of–the–Art Technology Seminar", Tab 26, "Cogeneration Application Considerations", Fisk et al., Aug. 1996.

"39th GE Turbine State–of–the–Art Technology Seminar", Tab 27, "Performance and Economic Considerations of Repowering Steam Power Plants", Stoll et al., Aug. 1996.
"39th GE Turbine State–of–the–Art Technology Seminar", Tab 28, "High–Power–Density™ Steam Turbine Design Evolution", J. H. Moore, Aug. 1996.
"39th GE Turbine State–of–the–Art Technology Seminar", Tab 29, "Advances in Steam Path Technologies", Cofer, IV, et al., Aug. 1996.
"39th GE Turbine State–of–the–Art Technology Seminar", Tab 30, "Upgradable Opportunities for Steam Turbines", D. R. Dreier, Jr., Aug. 1996.
"39th GE Turbine State–of–the–Art Technology Seminar", Tab 31, "Uprate Options for Industrial Turbines", R. C. Beck, Aug. 1996.
"39th GE Turbine State–of–the–Art Technology Seminar", Tab 32, "Thermal Performance Evaluation and Assessment of Steam Turbine Units", P. Albert, Aug. 1996.
"39th GE Turbine State–of–the–Art Technology Seminar", Tab 33, "Advances in Welding Repair Technology" J. F. Nolan. Aug. 1996.
"39th GE Turbine State–of–the–Art Technology Seminar", Tab 34, "Operation and Maintenance Strategies to Enhance Plant Profitability", MacGillivray et al., Aug. 1996.
"39th GE Turbine State–of–the–Art Technology Seminar", Tab 35, "Generator Insitu Inspections", D. Stanton.
"39th GE Turbine State–of–the–Art Technology Seminar", Tab 36, "Generator Upgrade and Rewind", Halpern et al., Aug. 1996.
"39th GE Turbine State–of–the–Art Technology Seminar", Tab 37, "GE Combined Cycle Product Line and Performance", Chase, et al., Aug. 1996.
"39th GE Turbine State–of–the–Art Technology Seminar", Tab 38, "GE Combined Cycle Experience", Maslak et al., Aug. 1996.
"39th GE Turbine State–of–the–Art Technology Seminar", Tab 39, "Single–Shaft Combined Cycle Power Generation Systems", Tomlinson et al., Aug. 1996.
"Advanced Turbine System Program—Conceptual Design and Product Development", Annual Report, Sep. 1, 1994–Aug. 31, 1995.
"Advanced Turbine System (ATS Program) Conceptual Design and Product Development", Final Technical Progress Report, vol. 2– Industrial Machine, Mar. 31, 1997, Morgantown, WV.
"Advanced Turbine Systems (ATS Program), Conceptual Design and Product Development", Final Technical Progress Report, Aug. 31, 1996, Morgantown, WV.
"Advanced Turbine Systems (ATS) Program, Phase 2, Conceptual Design and Product Development", Yearly Technical Progress Report, Reporting Period: Aug. 25, 1993–Aug. 31, 1994.
"Advanced Turbine Systems" Annual Program Review, Preprints, Nov. 2–4, 1998, Washington, D.C. U.S. Department of Energy, Office of Industrial Technologies Federal Energy Technology Center.
"ATS Conference" Oct. 28, 1999, Slide Presentation.
"Baglan Bay Launch Site", various articles relating to Baglan Energy Park.
"Baglan Energy Park", Brochure.
"Commercialization", Del Williamson, Present, Global Sales, May 8, 1998.

"Environmental, Health and Safety Assessment: ATS 7H Program (Phase 3R) Test Activities at the GE Power Systems Gas Turbine Manufacturing Facility, Greenville, SC", Document #1753, Feb. 1998, Publication Date: Nov. 17, 1998, Report Nos. DE–FC21–95MC31176—11.

"Exhibit panels used at 1995 product introduction at PowerGen Europe".

"Extensive Testing Program Validates High Efficiency, reliability of GE's Advanced "H" Gas Turbine Technology", Press Information, Press Release, 96–NR14, Jun. 26, 1996, H Technology Tests/pp. 1–4.

"Extensive Testing Program Validates High Efficiency, Reliability of GE's Advanced "H" Gas Turbine Technology", GE Introduces Advanced Gas Turbine Technology Platform: First to Reach 60% Combined–Cycle Power Plant Efficiency, Press Information, Press Release, Power–Gen Europe '95, 95–NRR15, Advanced Technology Introduction/pp. 1–6.

"Gas, Steam Turbine Work as Single Unit in GE's Advanced H Technology Combined–Cycle System", Press Information, Press Release, 95–NR18, May 16, 1995, Advanced Technology Introduction/pp. 1–3.

"GE Breaks 60% Net Efficiency Barrier" paper, 4 pages.

"GE Businesses Share Technologies and Experts to Develop State–Of–The–Art Products", Press Information, Press Release 95–NR10, May 16, 1995, GE Technology Transfer/pp. 1–3.

"General Electric ATS Program Technical Review, Phase 2 Activities", T. Chance et al., pp. 1–4.

"General Electric's DOE/ATS H Gas Turbine Development" Advanced Turbine Systems Annual Review Meeting, Nov. 7–8, 1996, Washington, D.C., Publication Release.

"H Technology Commercialization", 1998 MarComm Activity Recommendation, Mar., 1998.

"H Technology", Jon Ebacher, VP, Power Gen Technology, May 8, 1998.

"H Testing Process", Jon Ebacher, VP, Power Gen Technology, May 8, 1998.

"Heavy–Duty & Aeroderivative Products" Gas Turbines, Brochure, 1998.

"MS7001H/MS9001H Gas Turbine, gepower.com website for PowerGen Europe" Jun. 1–3 going public Jun. 15, (1995).

"New Steam Cooling System is a Key to 60% Efficiency For GE "H" Technology Combined–Cycle Systems", Press Information, Press Release, 95–NRR16, May 16, 1995, H Technology/pp. 1–3.

"Overview of GE's H Gas Turbine Combined Cycle", Jul. 1, 1995 to Dec. 31, 1997.

"Power Systems for the $21^{st}$ Century—"H" Gas Turbine Combined Cycles", Thomas C. Paul et al., Report.

"Power–Gen '96 Europe", Conference Programme, Budapest, Hungary, Jun. 26–28, 1996.

"Power–Gen International", 1998 Show Guide, Dec. 9–11, 1998, Orange County Convention Center, Orlando, Florida.

"Press Coverage following 1995 product announcement"; various newspaper clippings relating to improved generator.

"Proceedings of the Advanced Turbine Systems Annual Program Review Meeting", vol. I, "Industrial Advanced Turbine Systems Program Overview", D.W. Esbeck, p. 3–13, Oct., 1995.

"Proceedings of the Advanced Turbine Systems Annual Program Review Meeting", vol. I, "H Gas Turbine Combined Cycle", J. Corman, p. 14–21, Oct., 1995.

"Proceedings of the Advanced Turbine Systems Annual Program Review Meeting", vol. I, "Overview of Westinghouse's Advanced Turbine Systems Program", Bannister et al., p. 22–30, Oct., 1995.

"Proceedings of the Advanced Turbine Systems Annual Program Review Meeting", vol. I, "Allison Engine ATS Program Technical Review", D. Mukavetz, p. 31–42, Oct., 1995.

"Proceedings of the Advanced Turbine Systems Annual Program Review Meeting", vol. I, "Advanced Turbine Systems Program Industrial System Concept Development", S. Gates, p. 43–63, Oct., 1995.

"Proceedings of the Advanced Turbine Systems Annual Program Review Meeting", vol. I, "Advanced Turbine System Program Phase 2 Cycle Selection", Latcovich, Jr., p. 64–69, Oct., 1995.

"Proceedings of the Advanced Turbine Systems Annual Program Review Meeting", vol. I, "General Electric ATS Program Technical Review Phase 2 Activities", Chance et al., p. 70–74, Oct., 1995.

"Proceedings of the Advanced Turbine Systems Annual Program Review Meeting", vol. I, "Technical Review of Westinghouse's Advanced Turbine Systems Program", Diakunchak et al., p. 75–86, Oct., 1995.

"Proceedings of the Advanced Turbine Systems Annual Program Review Meeting", vol. I, "Advanced Combustion Turbines and Cycles: An EPRI Perspective", Touchton et al., p. 87–88, Oct., 1995.

"Proceedings of the Advanced Turbine Systems Annual Program Review Meeting", vol. I, "Advanced Turbine Systems Annual Program Review", William E. Koop, p. 89–92, Oct., 1995.

"Proceedings of the Advanced Turbine Systems Annual Program Review Meeting", vol. I, "The AGTSR Consortium: An Update", Fant et al., p. 93–102, Oct., 1995.

"Proceedings of the Advanced Turbine Systems Annual Program Review Meeting", vol. I, "Overview of Allison/AGTSR Interactions", Sy A. Ali, P. 103–106, Oct., 1995.

"Proceedings of the Advanced Turbine Systems Annual Program Review Meeting", vol. I, "Design Factors for Stable Lean Premix Combustion", Richard et al., p. 107–113, Oct., 1995.

"Proceedings of the Advanced Turbine Systems Annual Program Review Meeting", vol. I, "Ceramic Stationary As Turbine", M. van Roode, p. 114–147, Oct., 1995.

"Proceedings of the Advanced Turbine Systems Annual Program Review Meeting", vol. I, "DOE/Allison Ceramic Vane Effort", Wenglarz et al., p. 148–151, Oct., 1995.

"Proceedings of the Advanced Turbine Systems Annual Program Review Meeting", vol. I, "Materials/Manufacturing Element of the Advanced Turbine Systems Program", Karnitz et al., p. 152–160, Oct., 1995.

"Proceedings of the Advanced Turbine Systems Annual Program Review Meeting", vol. I, "Land–Based Turbine Casting Initiative", Mueller et al., p. 161–170, Oct., 1995.

"Proceedings of the Advanced Turbine Systems Annual Program Review Meeting", vol. I, "Turbine Airfoil Manufacturing Technology", Kortovich, p. 171–181, Oct., 1995.

"Proceedings of the Advanced Turbine Systems Annual Program Review Meeting", vol. I, "Pratt & Whitney Thermal Barrier Coatings", Bornstein et al., p. 182–193, Oct., 1995.

"Proceedings of the Advanced Turbine Systems Annual Program Review Meeting", vol. I, "Westinhouse Thermal Barrier Coatings", Goedjen et al., p. 194–199, Oct., 1995.

"Proceedings of the Advanced Turbine Systems Annual Program Review Meeting", vol. I, "High Performance Steam Development", Duffy et al., p. 200–220, Oct., 1995.

"Proceedings of the Advanced Turbine Systems Annual Program Review Meeting", vol. II, "Lean Premixed Combustion Stabilized by Radiation Feedback and heterogeneous Catalysis", Dibble et al., p. 221–232, Oct., 1995.

"Proceedings of the Advanced Turbine Systems Annual Program Review Meeting", vol. II, Rayleigh/Raman/LIF Measurements in a Turbulent Lean Premixed Combustor, Nandula et al. p. 233–248, Oct., 1995.

"Proceedings of the Advanced Turbine Systems Annual Program Review Meeting", vol. II, "Lean Premixed Flames for Low $No_x$ Combustors", Sojka et al., p. 249–275, Oct., 1995.

"Proceedings of the Advanced Turbine Systems Annual Program Review Meeting", vol. II, "Functionally Gradient Materials for Thermal Barrier Coatings in Advanced Gas Turbine Systems", Banovic et al., p. 276–280, Oct., 1995.

"Proceedings of the Advanced Turbine Systems Annual Program Review Meeting", vol. II, "Advanced Turbine Cooling, Heat Transfer, and Aerodynamic Studies", Han et al., p. 281–309, Oct., 1995.

"Proceedings of the Advanced Turbine Systems Annual Program Review Meeting", vol. II, "Life Prediction of Advanced Materials for Gas Turbine Application", Zamrik et al., p. 310–327, Oct., 1995.

"Proceedings of the Advanced Turbine Systems Annual Program Review Meeting", vol. II, "Advanced Combustion Technologies for Gas Turbine Power Plants", Vandsburger et al., p. 328–352, Oct., 1995.

"Proceedings of the Advanced Turbine Systems Annual Program Review Meeting", vol. II, "Combustion Modeling in Advanced Gas Turbine Systems", Smoot et al., p. 353–370, Oct., 1995.

"Proceedings of the Advanced Turbine Systems Annual Program Review Meeting", vol. II, "Heat Transfer in a Two–Pass Internally Ribbed Turbine Blade Coolant Channel with Cylindrical Vortex Generators", Hibbs et al. p. 371–390, Oct., 1995.

"Proceedings of the Advanced Turbine Systems Annual Program Review Meeting", vol. II, "Rotational Effects on Turbine Blade Cooling", Govatzidakia et al., p. 391–392, Oct., 1995.

"Proceedings of the Advanced Turbine Systems Annual Program Review Meeting", vol. II, "Manifold Methods for Methane Combustion", Yang et al., p. 393–409, Oct., 1995.

"Proceedings of the Advanced Turbine Systems Annual Program Review Meeting", vol. II, "Advanced Multistage Turbine Blade Aerodynamics, Performance, Cooling, and Heat Transfer", Fleeter et al., p. 410–414, Oct., 1995.

"Proceedings of the Advanced Turbine Systems Annual Program Review Meeting, vol. II", The Role of Reactant Unmixedness, Strain Rate, and Length Scale on Premixed Combustor Performance, Samuelsen et al., p. 415–422, Oct., 1995.

"Proceedings of the Advanced Turbine Systems Annual Program Review Meeting", vol. II, "Experimental and Computational Studies of Film Cooling With Compound Angle Injection", Goldstein et al., p. 423–451, Oct., 1995.

"Proceedings of the Advanced Turbine Systems Annual Program Review Meeting", vol. II, "Compatibility of Gas Turbine Materials with Steam Cooling", Desai et al., p. 452–464, Oct., 1995.

"Proceedings of the Advanced Turbine Systems Annual Program Review Meeting", vol. II, "Use of a Laser–Induced Fluorescence Thermal Imaging System for Film Cooling Heat Transfer Measurement", M. K. Chyu, p. 465–473, Oct., 1995.

"Proceedings of the Advanced Turbine Systems Annual Program Review Meeting", vol. II, Effects of Geometry on Slot–Jet Film Cooling Performance, Hyams et al., p. 474–496 Oct., 1995.

"Proceedings of the Advanced Turbine Systems Annual Program Review Meeting", vol. II, "Steam as Turbine Blade Coolant: Experimental Data Generation", Wilmsen et al., p. 497–505, Oct., 1995.

"Proceedings of the Advanced Turbine Systems Annual Program Review Meeting", vol. II, "Combustion Chemical Vapor Deposited Coatings for Thermal Barrier Coating Systems", Hampikian et al., p. 506–515, Oct., 1995.

"Proceedings of the Advanced Turbine Systems Annual Program Review Meeting", vol. II, "Premixed Burner Experiments: Geometry, Mixing, and Flame Structure Issues", Gupta et al., p. 516–528, Oct., 1995.

"Proceedings of the Advanced Turbine Systems Annual Program Review Meeting", vol. II, "Intercooler Flow Path for Gas Turbines: CFD Design and Experiments", Agrawal et al., p. 529–538, Oct., 1995.

"Proceedings of the Advanced Turbine Systems Annual Program Review Meeting", vol. II, "Bond Strength and Stress Measurements in Thermal Barrier Coatings", Gell et al., p. 539–549, Oct., 1995.

"Proceedings of the Advanced Turbine Systems Annual Program Review Meeting", vol. II, "Active Control of Combustion Instabilities in Low $NO_x$ Gas Turbines", Zinn et al., p. 550–551, Oct., 1995.

"Proceedings of the Advanced Turbine Systems Annual Program Review Meeting", vol. II, "Combustion Instability Modeling and Analysis", Santoro et al., p. 552–559, Oct., 1995.

"Proceedings of the Advanced Turbine Systems Annual Program Review Meeting", vol. II, "Flow and Heat Transfer in Gas Turbine Disk Cavities Subject to Nonuniform External Pressure Field", Roy et al., p. 560–565, Oct., 1995.

"Proceedings of the Advanced Turbine Systems Annual Program Review Meeting", vol. II, "Heat Pipe Turbine Vane Cooling", Langston et al., p. 566–572, Oct., 1995.

"Proceedings of the Advanced Turbine Systems Annual Program Review Meeting", Vol. II "Improved Modeling Techniques for Turbomachinery Flow Fields", Lakshminarayana et al., p. 573–581, Oct., 1995.

"Proceedings of the Advanced Turbine Systems Annual Program Review Meeting", vol. II, "Advanced 3D Inverse Method for Designing Turbomachine Blades", T. Dang, p. 582, Oct. 1995.

"Proceedings of the Advanced Turbine Systems Annual Program Review Meeting", "Gas Turbine Association Agenda", William H. Day, p. 3–16, Nov., 1996.

"Proceedings of the Advanced Turbine Systems Annual Program Review Meeting", "ATS and the Industries of the Future", Denise Swink, p. 1, Nov., 1996.

"Proceedings of the Advanced Turbine Systems Annual Program Review Meeting", "Power Needs in the Chemical Industry", Keith Davidson, p. 17–26, Nov., 1996.

"Proceedings of the Advanced Turbine Systems Annual Program Review Meeting", "Advanced Turbine Systems Program Overview", David Esbeck, p. 27–34, Nov., 1996.

"Proceedings of the Advanced Turbine Systems Annual Program Review Meeting", "Westinghouse's Advanced Turbine Systems Program", Gerard McQuiggan, p. 35–48, Nov., 1996.

"Proceedings of the Advanced Turbine Systems Annual Program Review Meeting", "Overview of GE's H Gas Turbine Combined Cycle", Cook et al., p. 49–72, Nov., 1996.

"Proceedings of the Advanced Turbine Systems Annual Program Review Meeting", "Allison Advanced Simple Cycle Gas Turbine System", William D. Weisbrod, p. 73–94, Nov., 1996.

"Proceedings of the Advanced Turbine Systems Annual Program Review Meeting", "The AGTSR Industry–University Consortium", Lawrence P. Golan, p. 95–110, Nov., 1996.

"Proceedings of the Advanced Turbine Systems Annual Program Review Meeting", "$NO_x$ and CO Emissions Models for Gas–Fired Lean–Premixed Combustion Turbines", A. Mellor, p. 111–122, Nov., 1996.

"Proceedings of the Advanced Turbine Systems Annual Program Review Meeting", "Methodologies for Active Mixing and Combustion Control", Uri Vandsburger, p. 123–156, Nov., 1996.

"Proceedings of the Advanced Turbine Systems Annual Program Review Meeting", "Combustion Modeling in Advanced Gas Turbine Systems", Paul O. Hedman, p. 157–180, Nov., 19967.

"Proceedings of the Advanced Turbine Systems Annual Program Review Meeting", "Manifold Methods for Methane Combustion", Stephen B. Pope, p. 181–188, Nov., 1996.

"Proceedings of the Advanced Turbine Systems Annual Program Review Meeting", "The Role of Reactant Unmixedness, Strain Rate, and Length Scale on Premixed Combustor Performance", Scott Samuelsen, p. 189–210, Nov., 1996.

"Proceedings of the Advanced Turbine Systems Annual Program Review Meeting", "Effect of Swirl and Momentum Distribution on Temperature Distribution in Premixed Flames", Ashwani K. Gupta, p. 211–232, Nov., 1996.

"Proceedings of the Advanced Turbine Systems Annual Program Review Meeting", "Combustion Instability Studies Application to Land–Based Gas Turbine Combustors", Robert J. Santoro, p. 233–252.

"Proceedings of the Advanced Turbine Systems Annual Program Review Meeting", Active Control of Combustion Instabilities in Low $NO_x$ Turbines, Ben T. Zinn, p. 253–264, Nov., 1996.

"Proceedings of the Advanced Turbine Systems Annual Program Review Meeting", "Life Prediction of Advanced Materials for Gas Turbine Application," Sam Y. Zamrik, p. 265–274, Nov., 1996.

"Proceedings of the Advanced Turbine Systems Annual Program Review Meeting", "Combustion Chemical Vapor Deposited Coatings for Thermal Barrier Coating Systems", W. Brent Carter, p. 275–290, Nov., 1996.

"Proceedings of the Advanced Turbine Systems Annual Program Review Meeting", "Compatibility of Gas Turbine Materials with Steam Cooling", Vimal Desai, p. 291–314, Nov., 1996.

"Proceedings of the Advanced Turbine Systems Annual Program Review Meeting", "Bond Strength and Stress Measurements in Thermal Barrier Coatings", Maurice Gell, p. 315–334, Nov., 1996.

"Proceedings of the Advanced Turbine Systems Annual Program Review Meeting", "Advanced Multistage Turbine Blade Aerodynamics, Performance, Cooling and Heat Transfer", Sanford Fleeter, p. 335–356, Nov., 1996.

"Proceedings of the Advanced Turbine Systems Annual Program Review Meeting", "Flow Characteristics of an Intercooler System for Power Generating Gas Turbines", Ajay K. Agrawal, p. 357–370, Nov., 1996.

"Proceedings of the Advanced Turbine Systems Annual Program Review Meeting", "Improved Modeling Techniques for Turbomachinery Flow Fields", B. Lakshiminarayana, p. 371–392, Nov., 1996.

"Proceedings of the Advanced Turbine Systems Annual Program Review Meeting", "Development of an Advanced 3d & Viscous Aerodynamic Design Method for Turbomachine Components in Utility and Industrial Gas Turbine Applications", Thong Q. Dang, p. 393–406, Nov., 1996.

"Proceedings of the Advanced Turbine Systems Annual Program Review Meeting", "Advanced Turbine Cooling, Heat Transfer, and Aerodynamic Studies", Je–Chin Han, p. 407–426, Nov., 1996.

"Proceedings of the Advanced Turbine Systems Annual Program Review Meeting", "Heat Transfer in a Two–Pass Internally Ribbed Turbine Blade Coolant Channel with Vortex Generators", S. Acharya, p. 427–446.

"Proceedings of the Advanced Turbine Systems Annual Program Review Meeting", "Experimental and Computational Studies of Film Cooling with Compound Angle Injection", R. Goldstein, p. 447–460, Nov., 1996.

"Proceedings of the Advanced Turbine Systems Annual Program Review Meeting", "Study of Endwall Film Cooling with a Gap Leakage Using a Thermographic Phosphor Fluorescence Imaging System", Mingking K. Chyu, p. 461–470, Nov., 1996.

"Proceedings of the Advanced Turbine Systems Annual Program Review Meeting", "Steam as a Turbine Blade Coolant: External Side Heat Transfer", Abraham Engeda, p. 471–482, Nov., 1996.

"Proceedings of the Advanced Turbine Systems Annual Program Review Meeting", "Flow and Heat Transfer in Gas Turbine Disk Cavities Subject to Nonuniform External Pressure Field", Ramendra Roy, p. 483–498, Nov., 1996.

"Proceedings of the Advanced Turbine Systems Annual Program Review Meeting", "Closed–Loop Mist/Steam Cooling for Advanced Turbine Systems", Ting Wang, p. 499–512, Nov., 1996.

"Proceedings of the Advanced Turbine Systems Annual Program Review Meeting", "Heat Pipe Turbine Vane Cooling", Langston et al., p. 513–534, Nov., 1996.

"Proceedings of the Advanced Turbine Systems Annual Program Review Meeting", "EPRI's Combustion Turbine Program: Status and Future Directions", Arthur Cohn, p. 535,–552 Nov., 1996.

"Proceedings of the Advanced Turbine Systems Annual Program Review Meeting", "ATS Materials Support", Michael Karnitz, p. 553–576, Nov., 1996.

"Proceedings of the Advanced Turbine Systems Annual Program Review Meeting", "Land Based Turbine Casting Initiative", Boyd A. Mueller, p. 577–592, Nov., 1996.

"Proceedings of the Advanced Turbine Systems Annual Program Review Meeting", "Turbine Airfoil Manufacturing Technology", Charles S. Kortovich, p. 593–622, Nov., 1996.

"Proceedings of the Advanced Turbine Systems Annual Program Review Meeting", "Hot Corrosion Testing of TBS's", Norman Bornstein, p. 623–631, Nov., 1996.

"Proceedings of the Advanced Turbine Systems Annual Program Review Meeting", "Ceramic Stationary Gas Turbine", Mark van Roode, p. 633–658, Nov., 1996.

"Proceedings of the Advanced Turbine Systems Annual Program Review Meeting", "Western European Status of Ceramics for Gas Turbines", Tibor Bornemisza, p. 659–670, Nov., 1996.

"Proceedings of the Advanced Turbine Systems Annual Program Review Meeting", "Status of Ceramic Gas Turbines in Russia", Mark van Roode, p. 671, Nov., 1996.

"Status Report: The U.S. Department of Energy's Advanced Turbine systems Program", facsimile dated Nov. 7, 1996.

"Testing Program Results Validate GE's H Gas Turbine—High Efficiency, Low Cost of Electricity and Low Emissions", Roger Schonewald and Patrick Marolda, (no date available).

"Testing Program Results Validate GE's H Gas Turbine—High Efficiency, Low Cost of Electricity and Low Emissions", Slide Presentation—working draft, (no date available).

"The Next Step In H . . . For Low Cost Per kW–Hour Power Generation", LP–1 PGE '98.

"Utility Advanced Turbine System (ATS) Technology Readiness Testing and Pre–Commercialization Demonstration", Document #486040, Oct. 1–Dec. 31, 1996, Publication Date, Jun. 1, 1997, Report Nos.: DOE/MC/31176—5628.

"Utility Advanced Turbine System (ATS) Technology Readiness Testing—Phase 3", Document #666274, Oct. 1, 1996–Sep. 30, 1997, Publication Date, Dec. 31, 1997, Report Nos.: DOE/MC/31176—10.

"Utility Advanced Turbine System (ATS) Technology Readiness Testing and Pre–Commercial Demonstration, Phase 3", Document #486029, Oct. 1–Dec. 31, 1995, Publication Date, May 1, 1997, Report Nos.: DOE/MC/31176—5340.

"Utility Advanced Turbine System (ATS) Technology Readiness Testing and Pre–Commercial Demonstration—Phase 3", Document #486132, Apr. 1–Jun. 30, 1976, Publication Date, Dec. 31, 1996, Report Nos.: DOE/MC/31176—5660.

"Utility Advanced Turbine System (ATS) Technology Readiness Testing and Pre–Commercial Demonstration—Phase 3", Document #587906, Jul. 1–Sep. 30, 1995, Publication Date, Dec. 31, 1995, Report Nos.: DOE/MC/31176—5339.

"Utility Advanced Turbine System (ATS) Technology Readiness Testing and Pre–Commercial Demonstration" Document #666277, Apr. 1–Jun. 30, 1997, Publication Date, Dec. 31, 1997, Report Nos.: DOE/MC/31176—8.

"Utility Advanced Turbine System (ATS) Technology Readiness Testing and Pre–Commercialization Demonstration" Jan. 1–Mar. 31, 1996, DOE/MC/31176—5338.

"Utility Advanced Turbine System (ATS) Technology Readiness Testing: Phase 3R", Document #756552, Apr. 1–Jun. 30, 1999, Publication Date, Sep. 1, 1999, Report Nos.: DE—FC21–95MC31176–23.

"Utility Advanced Turbine System (ATS) Technology Readiness Testing.", Document #656823, Jan. 1–Mar. 31, 1998, Publication Date, Aug. 1, 1998, Report Nos.: DOE/MC/31176–17.

"Utility Advanced Turbine Systems (ATS) Technology Readiness Testing and Pre–Commercial Demonstration", Annual Technical Progress Report, Reporting Period: Jul. 1, 1995–Sep. 30, 1996.

"Utility Advanced Turbine Systems (ATS) Technology Readiness Testing", Phase 3R, Annual Technical Progress Report, Reporting Period: Oct. 1, 1997–Sep. 30, 1998.

"Utility Advanced Turbine Systems (ATS) Technology Readiness Testing", Document #750405, Oct. 1–Dec. 30, 1998, Publication Date: May, 1, 1999, Report Nos.: DE–FC21–95MC31176–20.

"Utility Advanced Turbine Systems (ATS) Technology Readiness Testing", Document #1348, Apr. 1—Jun. 29, 1998, Publication Date Oct. 29, 1998, Report Nos. DE–FC21–95MC31176—18.

"Utility Advanced Turbine Systems (ATS) Technology Readiness Testing—Phase 3", Annual Technical Progress Report, Reporting Period: Oct. 1, 1996–Sep. 30, 1997.

"Utility Advanced Turbine Systems (ATS) Technology Readiness Testing and Pre–Commercial Demonstration", Quarterly Report, Jan. 1–Mar. 31, 1997, Document #666275, Report Nos.: DOE/MC/31176–07.

"Proceedings of the 1997 Advanced Turbine Systems", Annual Program Review Meeting, Oct. 28–29, 1997.

* cited by examiner

ROTOR COMPONENT DISPLACEMENT MEASUREMENT SYSTEM

This invention was made with Government support under Contract No. DE-FC21-95MC31176 awarded by the Department of Energy. The Government has certain rights in this invention.

BACKGROUND OF THE INVENTION

This invention relates generally to a system for measuring axial displacement in a rotating environment, and more specifically, to the measurement of relative axial movement between adjacent components in a gas turbine rotor assembly.

BRIEF SUMMARY OF THE INVENTION

In an advanced gas turbine power plant developed by the assignee of this invention, the stage 1 and 2 gas turbine buckets are closed circuit cooled with steam or air fed by a delivery system extending through the gas turbine rotor assembly. It is important to evaluate wear resulting from relative axial movement between the axial delivery tubes and the rotating turbine wheels. The rotor for which this measurement is required is approximately 59 inches in diameter and has a maximum rotational speed of 4200 rpm. The steam delivery tubes are buried deep within the massive rotor assembly and the sensors used to measure the axial displacement of these tubes must be mounted in an area which is approximately 24 inches from the machine center line, i.e., the rotor axis, and therefore must withstand repeated exposure to a centrifugal acceleration of over 12,000 g's. In addition, the temperature of the component to be measured will range from 75° F. to 250° F. and the area through which the signal leads must pass will be nearly 1000° F. The system must survive a series of 40-minute cycles to maximum speed and temperature; a life expectancy which exceeds 5000 cycles is desirable. The unit may be either self-powered or run from an external power source through a rotating power coupling device. The displacement signal will be transferred to a stationary platform through a rotating telemetry system capsule.

In accordance with an exemplary embodiment of the invention, a commercially available Bentley Nevada proximity transducer system is employed to sense the axial displacement measurement of four axially oriented steam supply cooling tubes arranged at 90° intervals about the rotor axis relative to stationary components in the rotor assembly, while the tubes and stationary components are rotating about the rotor axis.

The measurements are taken with transducers having no moving parts to jam, wear out or degrade, and the standard transducer probe is rated to a maximum temperature of 350° F. which is slightly above the expected temperature in the immediate area of the measurement. The transducers or sensors are oriented normal to the direction of motion of each steam delivery tube, concentrating on a measurement site which, in this case, is a sloped or curved region (or fillet radius) on the tube. This allows the tube to stay within the measurement distance range of the probe. Custom cabling is connected to the circumferentially spaced sensors, the cabling including mineral insulated metallic sheathed sections which will span the hot area, and lower temperature flexible sections for connection to the probes at one end and to oscillator/demodulator modules at the other end.

All of the oscillator/demodulator modules rotate near the machine center line in a module support ring supported by two permanently lubricated ball bearings between the machine bearing housing and the telemetry capsule. The modules are powered via a rotating induction power system mounted to the OD of the module support ring. Rectifiers, filters, and regulators within the induction power system rotating ring provide the 24 VDC required by the modules. The 2 to 18VDC output signals from the modules connect to the telemetry capsule via rotating circular connectors and a flexible coupling arrangement. The telemetry capsule samples the signals at a rate of approximately once per second and then digitally transmits the data to the ground station across a radio frequency link. The test cell data acquisition system then receives the digital data from the ground station via a serial link.

Due to the shape of the fillets on the tubes used as the targets for the measurement system, the output of the system will be inherently non-linear. For this reason, a detailed calibration must be performed in situ prior to running if an accurate absolute measurement of the tube movement is desired. Following the calibration, a curve-fit may be made and the resultant coefficients inserted into the data acquisition computer for engineering unit calculation.

Accordingly, in its broader aspects, the present invention relates to a measuring system for measuring axial displacement of a tube relative to an axially stationary component in a rotating rotor assembly having a longitudinal axis, the measuring system comprising at least one displacement sensor adapted for placement adjacent a longitudinal axis of the tube; an insulated cable system adapted for passage through the rotor assembly; an oscillator/demodulator module assembly located axially beyond the rotor assembly to which the cables are connected; and a telemetry system operatively connected to the module assembly for sampling signals from the module assembly and forwarding data to a ground station.

DETAILED DESCRIPTION OF THE INVENTION

Figure 1:
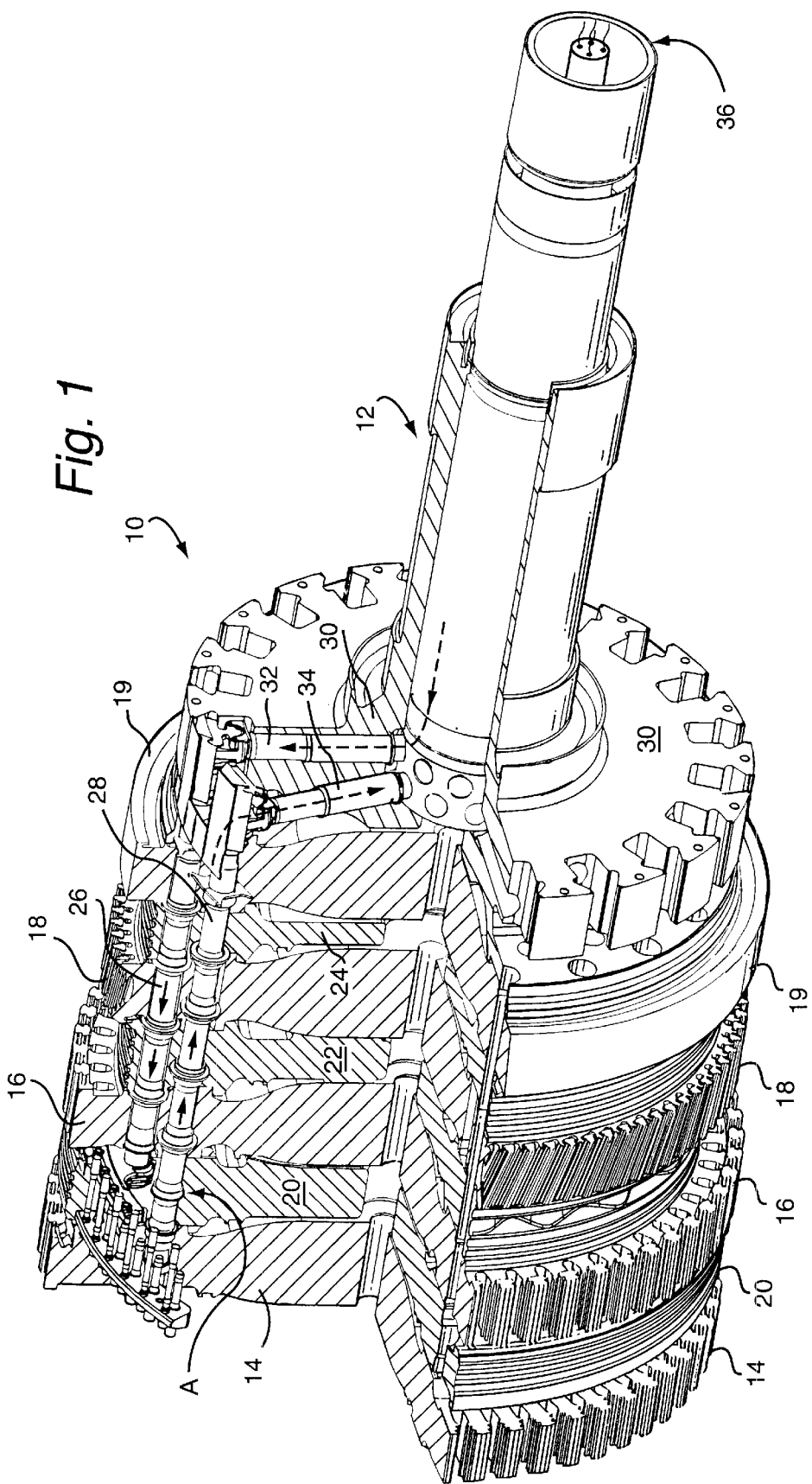
FIG. 1 is a partial perspective view, also partially sectioned, of a turbine rotor assembly incorporating the measurement system in accordance with the invention.

With reference to FIG. 1, a turbine rotor assembly 10 includes the rotor 12, four turbine wheels 14, 16, 18 and 19 separated by spacer wheels 20, 22 and 24. Each wheel 14, 16 and 18 supports a plurality of buckets or blades (not shown) which interact with stationary nozzles (also not shown) in a well known manner.

Inside the rotor assembly, a plurality of axially extending steam conduits or tubes (two shown at 26, 28) supply cooling steam to the buckets in the first and second stage wheels 14, 16, the cooling tubes 26, 28 extending from an aft wheel 30, where the cooling circuit extends radially inwardly via a plurality of tubes 32, 34, etc., before extending axially out of the rotor.

The location referenced by arrow A is one where the relative axial movement of the cooling tube 28 may be measured in accordance with this invention. Cables from the measurement transducers must extend through the rotor assembly to the oscillator/demodulator modules described further below. The cables first extend radially inwardly to the center region of the rotor and extend rearwardly to the electronics passage as also discussed further below. In FIG. 1, the axial portions of the cables are shown at 36. Since the four measurement locations and sensor probe arrangements are virtually identical, only one need be described in detail.

Figure 2:
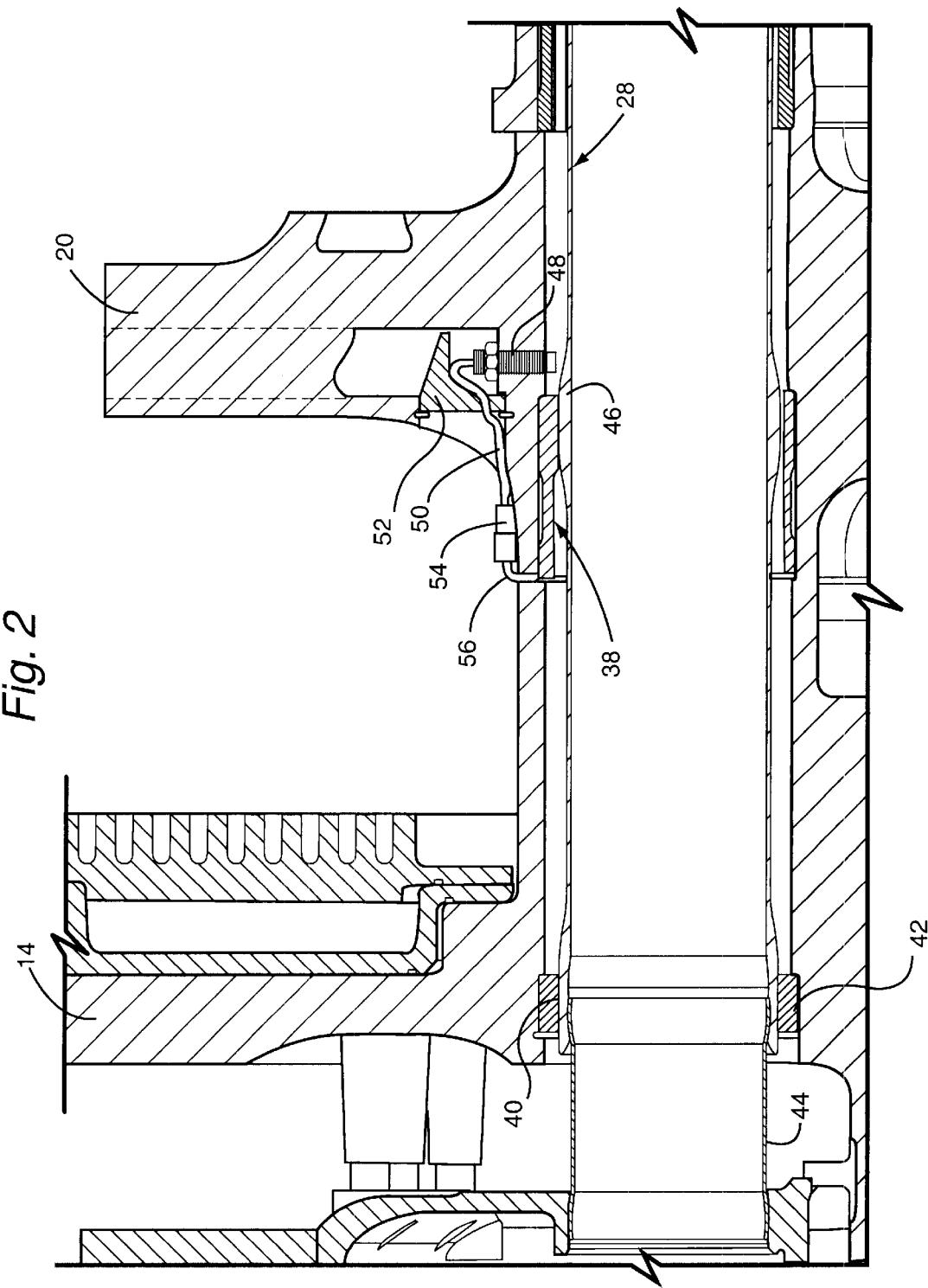
FIG. 2 is a partial section in an area of the rotor assembly which supports steam delivery tubes, and illustrates the location of a transducer mounted on a turbine wheel, with the tip of the transducer in close proximity to a fillet on an axially oriented steam delivery tube.
Figure 3:
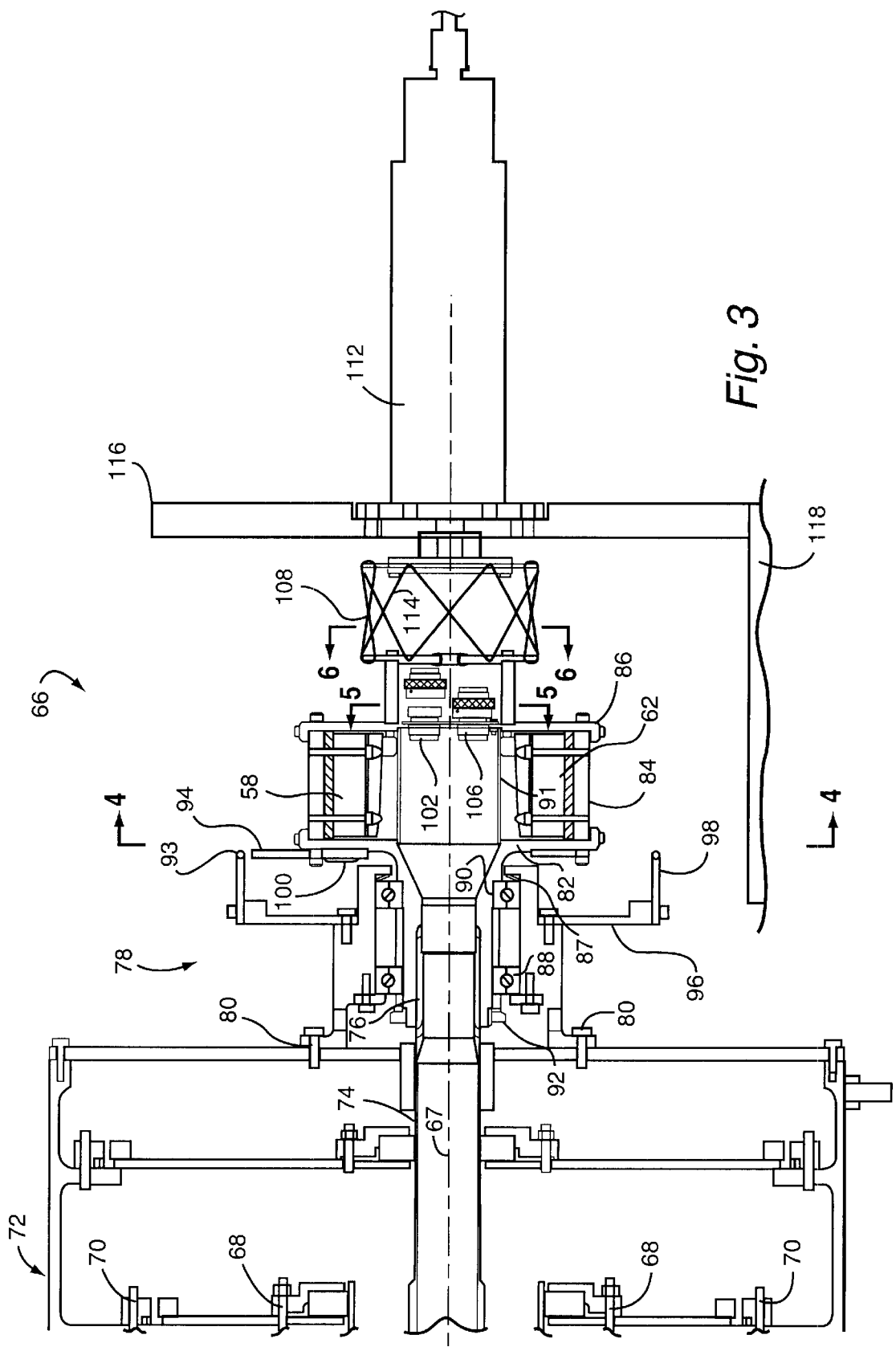
FIG. 3 is a partial side elevation of a rotating electronics package for use with the subject invention.
Figure 4:
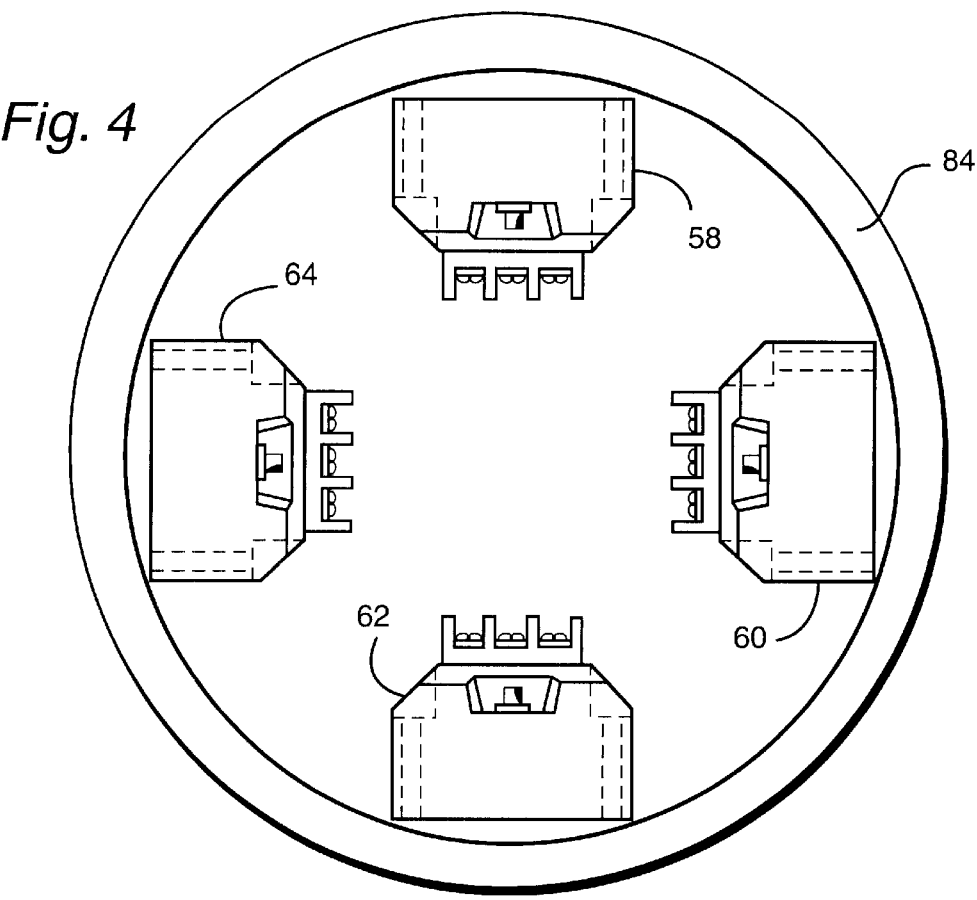
FIG. 4 is a section taken along the line 4—4 in FIG. 3.

Turning now to FIG. 2, an exaggerated detail view shows the axially extending steam cooling tube 28, passing through the stage 1–2 spacer wheel 20 where it is engaged by a fixed sleeve coupling 38. The free end 40 of the tube engages a fixed ring 42 in the stage 1 wheel 14 and receives a "spoolie" coupler 44. For purposes of this disclosure, the measurement of axial movement on the tube 28 relative to the sleeve coupling 38 is taken along a curved fillet or ramp 46 of the tube immediately adjacent the fixed sleeve coupling 38. A sensing transducer or sensor probe 48 is oriented normal to the direction of motion of the tube 28. By concentrating on the sloped ramp or fillet 46, the tube 28 will stay within the measurement distance range of the sensor probe. The sensor probe 48, which may be part of a commercially available Bentley Nevada 3300 Series Proximity Transducer System, has certain advantages, e.g., it has no moving parts to jam, wear out or degrade; the sensor probe 48 is rated to a maximum temperature of 350° F. which is slightly above the expected temperature in the immediate area; and the sensor probe is relatively inexpensive. The standard 3300 series transducer may, however, be ruggedized for rough service operation.

A flexible cable 50 extends from the sensor probe 48 through a wire guide 52 to a connector 54, from which the "hard" cable 56 extends to the center region of the rotor and then axially to the modules 58, 60, 62 and 64, recalling that there are four such axial cables 36 from four respective transducers or sensor probes adjacent four steam cooling tubes, located at approximately 90° intervals about the rotor structure. The modules 58, 60, 62 and 64 are preferably Proximity® modules available from the Bentley-Nevada Corporation.

The tube 28 in use will be subject to axial growth due to the high temperatures experienced inside the rotor assembly 10. Since the temperature and material properties of the tube are known, the extent of the axial movement due to thermal expansion can be predicted with some degree of accuracy. The tube 28 is also subject to radial movement, however, as a result of centrifugal forces on the tube due to rotor rotation. In this regard, note how the tube 28 engages the radially outer but not the radially inner end off the sleeve coupling 38 in FIG. 2. The centrifugal forces may also cause the round tube to "ovalize" and thus increase the radial movement adjacent the probe. Since the measured surface is a sloped ramp (or fillet) 46, any movement of the tube 28 will alter the distance between the sensor probe 48 and the ramp 46. The sensor probe 48 can, however, sense both radial and axial movement, albeit the radial movement is quite small. The axial movement may be substantial (e.g., about 0.383 inch) in that along the length of the tube 28, there are three or four axially spaced couplings like the sleeve coupling 38. The coupling at the stage 1–2 spacer wheel 20 will take up the loading on the other sleeve couplings, and the couplings have low friction surfaces to allow the tube 28 to expand smoothly. Since the system can be calibrated according to the thermal expansion characteristics of the tube material, the axial movement due to other causes, e.g., centrifugal ovalization and/or slip and slide motion, can be detected with great accuracy, i.e., down to 200 mils.

Figure 7:
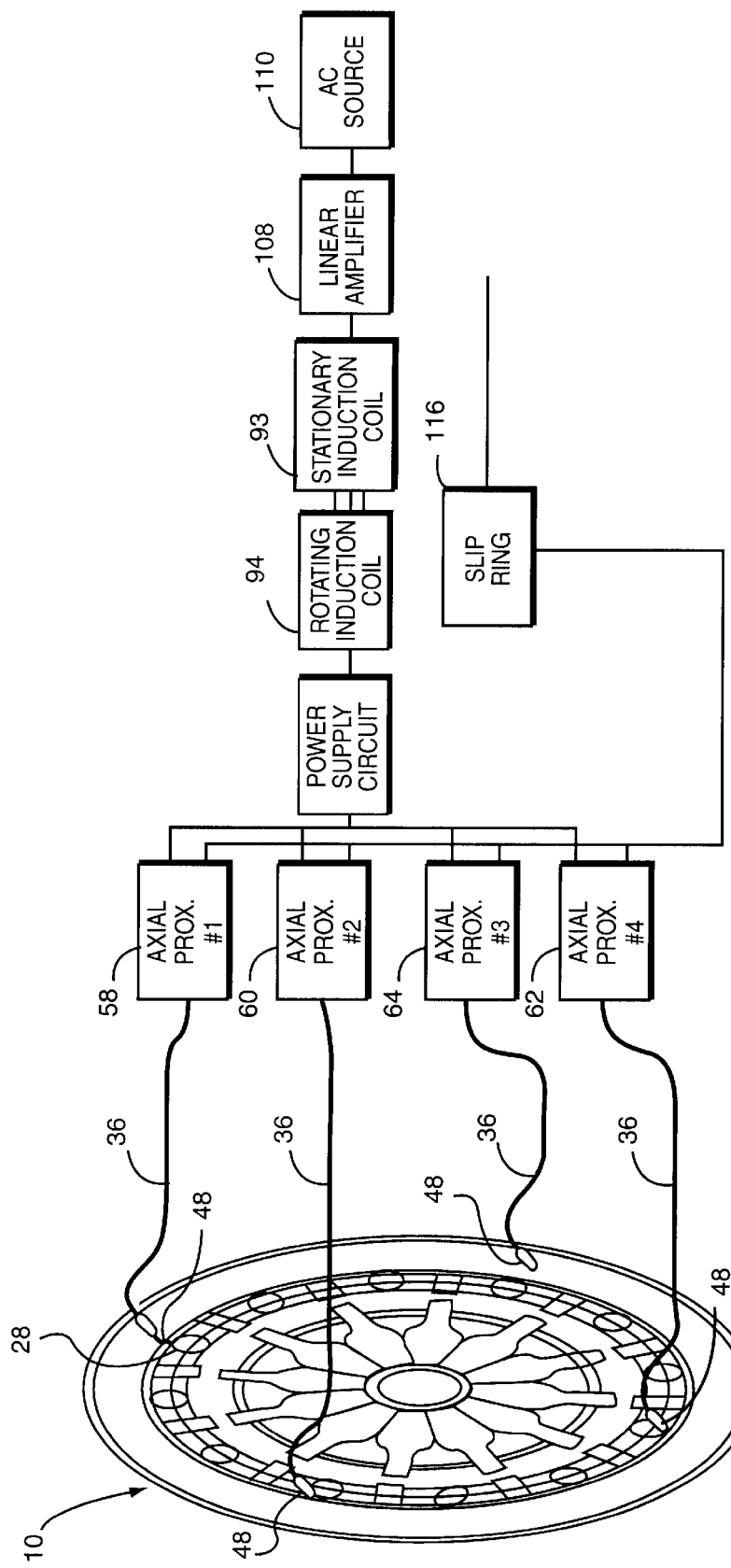
FIG. 7 is a functional block diagram of the axial displacement measurement system in accordance with the invention.

The sensed axial movement is transmitted via the cables 36 to the four circumferentially arranged oscillator/demodulator modules 58, 60, 62 and 64 arranged on the electronics package 66 shown in partially schematic form in FIGS. 3–6, and in the functional diagram in FIG. 7. With specific reference to FIG. 3, the package 66 is adapted to be attached to the rearward end of a bearing housing (not shown) for the turbine rotor by bolts (two shown at 68), guide pins (two shown at 70) and/or other appropriate means on the package frame 72, so that the centerline 67 of the package is in alignment with the axis of the rotor assembly 10. An instrument tube 74 with the cables 36 enclosed therein extends into the frame 72 and is connected via a spline 76 to the proximitor module assembly 78. The proximitor module assembly 78 is secured via bolts 80 to the frame 72. The modules 58, 60, 62 and 64 are enclosed within a front support plate 82, a support ring 84 and a rear plate 86. This subassembly is rotatable with the tube 74 by means of bearings 88, 90, the latter held in place by a retaining nut 92. A bearing load spring 87 is located axially behind the bearing. A larger diameter wire guide tube 91 (axially abutting the tube 74) extends centrally of the four modules 58, 60, 62 and 64 and connects to the rear support plate 86. Forward of the proximity modules, there are stationary primary and rotating secondary power coils 93, 94, respectively. Coil 93 is supported by a ring 96 and supports 98. Coil 94 is connected to power supply 100. This enables self-powering of the proximitor module assembly and thus the gathering of real time data during testing. Coils 93, 94 are connected to a linear amplifier 108 and an AC source 110 (see FIG. 7).

Figure 5:
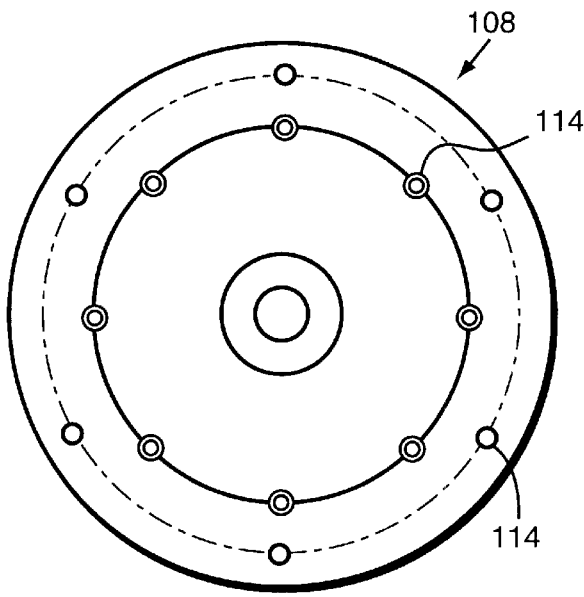
FIG. 5 is a section taken along the line 5—5 in FIG. 3.
Figure 6:
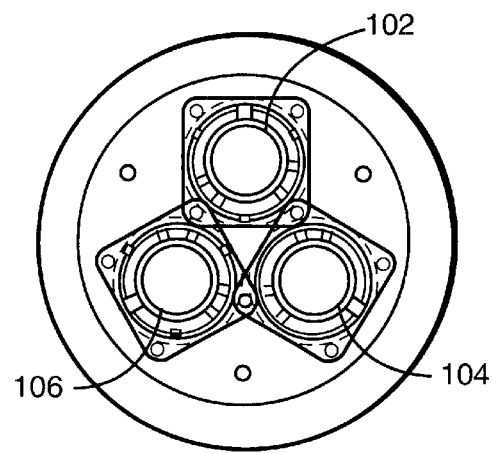
FIG. 6 is a section taken along the line 6—6 in FIG. 3.

Three stationary circular connectors 102, 104 and 106 are located behind the modules 58, 60, 62 and 64, one connector used to calibrate the package to a reference temperature and the remaining two connectors accommodating two each of the four cables 36 from the sensor probes 48. A flexible drive coupling 112 (employing Kevlar® lacing 114) is located between the module rear support plate 86 and a slip ring 116 supported by a mounting plate 118. FIG. 5 illustrates the lacing in the drive coupling from an end view. It is the flexible drive coupling and slip ring which convert the signals from the rotating to the stationary components. A functional diagram of the arrangement is shown in FIG. 7.

The flexible drive 112 and slip ring 116 are part of a rotating telemetry system available from Accumetrics, Inc. The telemetry system samples the signals at a rate of approximately once per second and then digitally transmits the data to a ground station via a radial frequency link. A test cell acquisition system then receives the digital data from the ground station via a serial link.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor assembly and a measuring system for measuring axial displacement of a tube relative to an axially stationary component in the rotor assembly having a longitudinal axis, the measuring system comprising:

at least one displacement sensor adapted for placement adjacent a longitudinal axis of the tube;

an insulated cable system connected at one end to said at least one displacement sensor adapted for passage through the rotor assembly;

an oscillator/demodulator module assembly located axially beyond said rotor assembly, said cable system connected at an opposite end to said module assembly; and a telemetry system operatively connected to said module assembly for sampling signals from said module assembly and forwarding data to a ground station.

2. The rotor assembly and measuring system of claim 1 wherein said displacement sensor is oriented substantially perpendicular to a longitudinal axis of said tube at a measurement site.

3. The rotor assembly and measuring system of claim 2 wherein said measurement site comprises a ramp on an external surface of the tube.

4. The rotor assembly and measuring system of claim 1 wherein said at least one displacement sensor comprises four displacement sensors at circumferentially spaced locations about said longitudinal axis of said rotor assembly.

5. The rotor assembly and measuring system of claim 1 wherein said at least one displacement sensor is connected to a cable that extends radially into a center region of said rotor assembly and then axially along said rotor assembly and operatively connected to said module assembly.

6. The system of claim 5 wherein said module assembly includes 4 modules mounted for rotation with said rotor assembly.

7. The rotor assembly and measuring system of claim 1 wherein said module assembly is self-powered.

8. A system for measuring axial displacement of one component relative to another in a rotating environment, the system comprising:

first means for sensing the axial displacement of one component relative to another component at a measurement site, while said first for sensing the axial displacement and both components are rotating about a common axis; and second means for transmitting data from said first means to a stationary site remote from said measurement site.

* * * * *

UNITED STATES PATENT AND TRADEMARK OFFICE
CERTIFICATE OF CORRECTION

PATENT NO. : 6,568,091 B1 Page 1 of 1
DATED : May 27, 2003
INVENTOR(S) : Mercer et al.

It is certified that error appears in the above-identified patent and that said Letters Patent is hereby corrected as shown below:

Column 6,
Line 17, after "first" insert -- means --.

Signed and Sealed this

Seventh Day of October, 2003

JAMES E. ROGAN
*Director of the United States Patent and Trademark Office*